April 7, 1959 J. G. BOKOWSKI 2,880,689
FLEXIBLE DRIVE COUPLING
Filed July 25, 1956 3 Sheets-Sheet 1
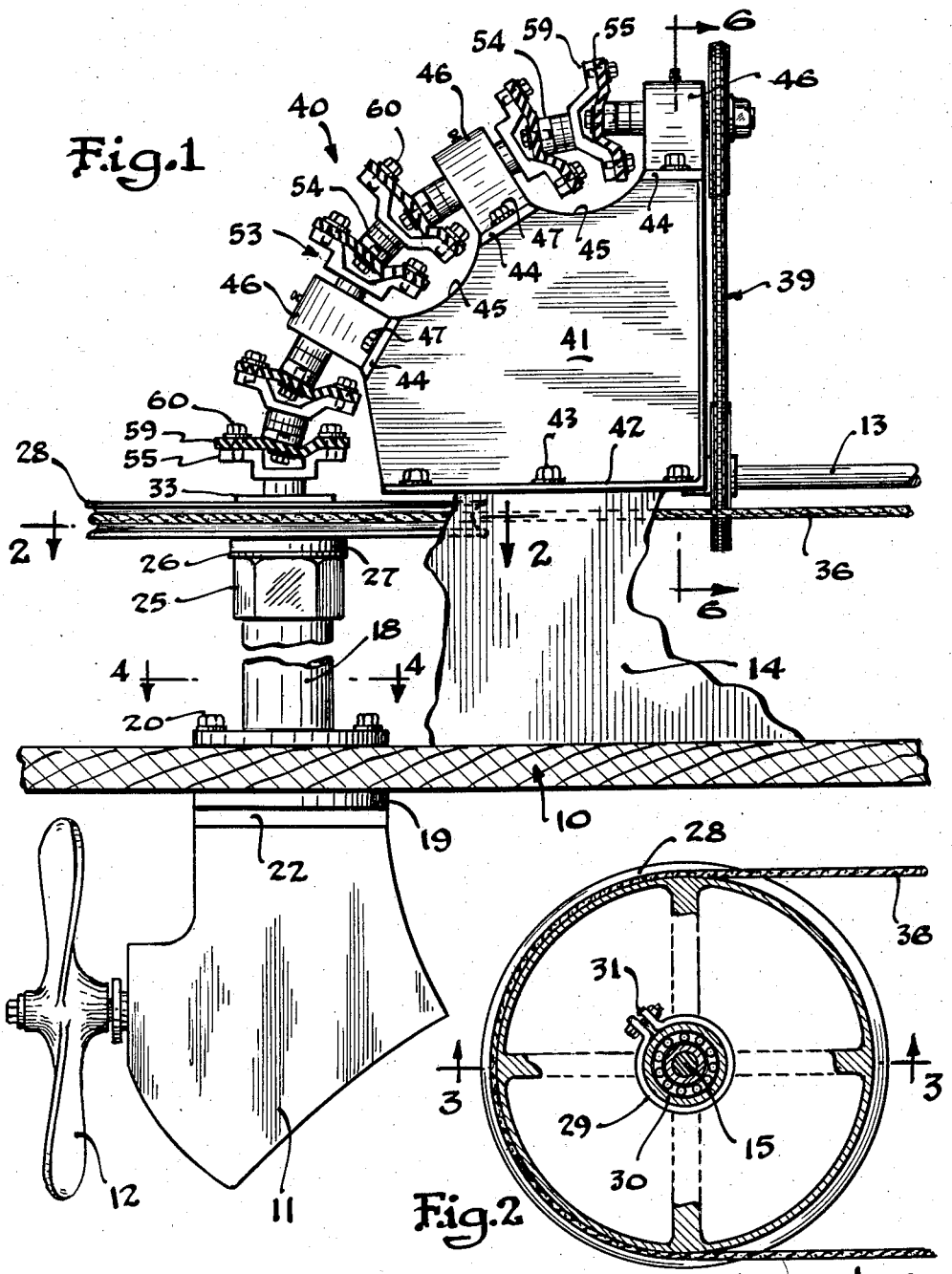
Inventor
Joseph G. Bokowski
By Mann, Brown & McWilliams
Attorneys

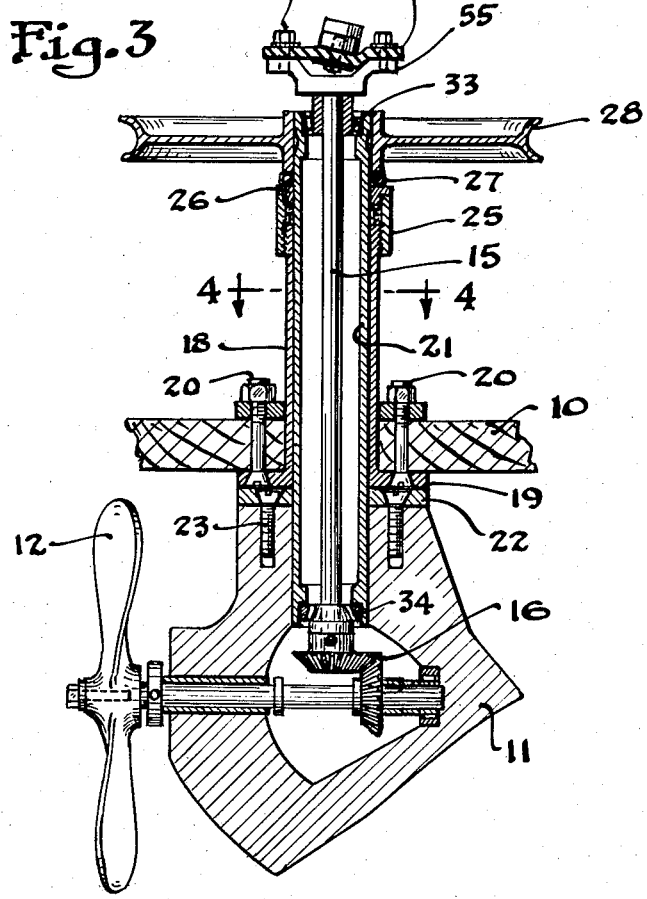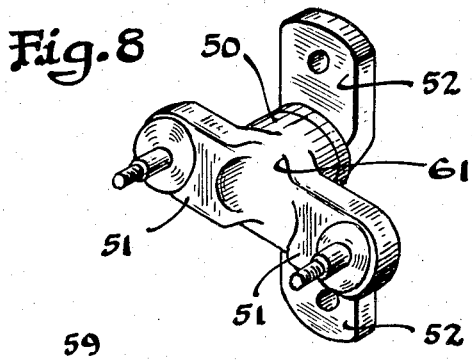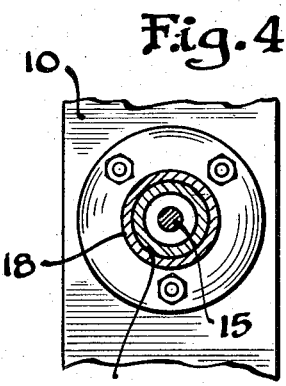

April 7, 1959 J. G. BOKOWSKI 2,880,689
FLEXIBLE DRIVE COUPLING
Filed July 25, 1956 3 Sheets-Sheet 3
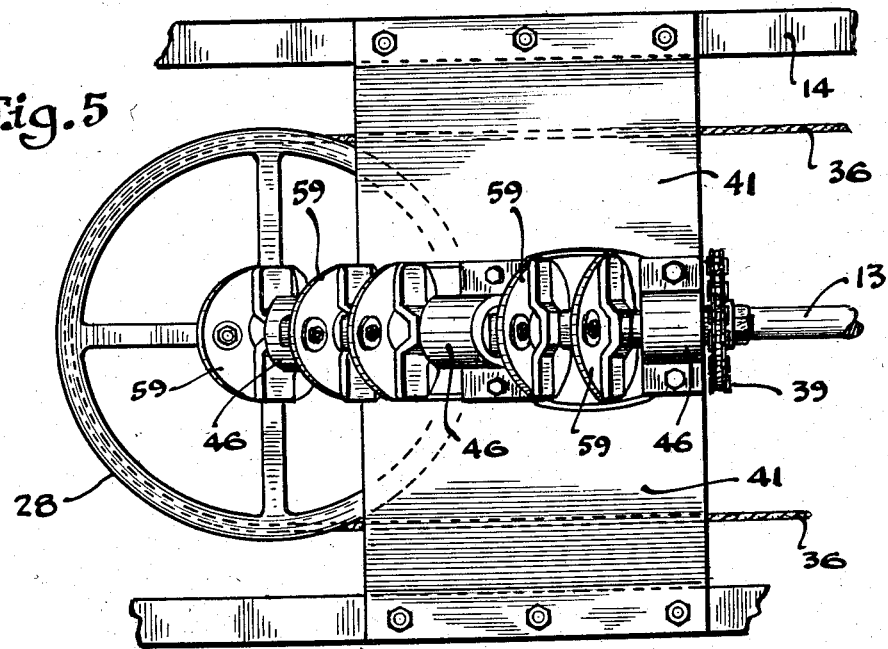
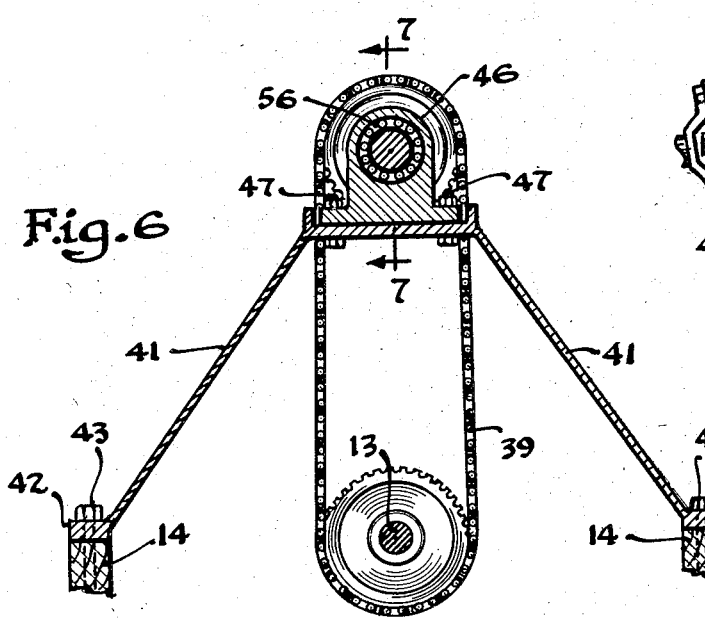 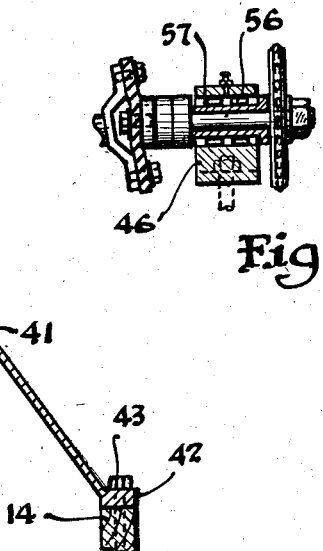
Inventor
Joseph G. Bokowski
By Mann, Brown & McWilliams
Attorneys United States Patent Office 2,880,689
Patented Apr. 7, 1959

2,880,689

FLEXIBLE DRIVE COUPLING

Joseph G. Bokowski, Chicago, Ill.

Application July 25, 1956, Serial No. 600,088

6 Claims. (Cl. 115—35)

This invention relates to a flexible drive coupling for transmitting rotary power between a pair of shafts, the axes of which are disposed in angular relationship, and more particularly is concerned with a coupling for transmitting power from a horizontally disposed rotating drive shaft such as is found in marine craft to a vertically disposed driven shaft that extends through the keel of the craft and actuates an impeller blade.

The principal object is to provide such a flexible drive coupling arrangement: that is highly efficient, smooth, and quiet in operation; and that readily accommodates universal impeller movement thereby avoiding the necessity of a costly marine engine of the reversible type and eliminating the usual rudder and the drag associated therewith.

Other objects and advantages of the invention will be apparent during the course of the following description.

In the accompanying drawings forming a part of this specification and in which like numerals are employed to designate like parts throughout the same, Fig. 1 is a side elevational view illustrating the application of the drive coupling of the invention in a marine craft;

Fig. 2 is a plan sectional view taken on the line 2—2 of Fig. 1;

Fig. 3 is a sectional side view of a portion of the apparatus of Fig. 1 and is taken on the line 3—3 of Fig. 2;

Fig. 4 is a plan sectional view taken on the line 4—4 of Fig. 1;

Fig. 5 is a top view of the arrangement of the invention;

Fig. 6 is an end sectional view taken on the line 6—6 of Fig. 1;

Fig. 7 is a fragmentary sectional view taken on the line 7—7 of Fig. 6; and

Fig. 8 is a perspective view of one of the elements comprising the flexible coupling.

Referring now to the drawings and particularly to Fig. 1, the invention is shown in the familiar surroundings of a marine craft which includes a hull having a keel 10 beneath which is disposed a chambered fin 11 that houses the driving elements for an impeller 12.

As shown, a rotating main drive shaft 13 extends in a horizontal plane and is disposed between a pair of endwise extending engine beds 14 that are mounted on the hull on opposite sides of the keel 10. The drive shaft 13 must deliver its torque to an intermediate vertical shaft 15 (see Fig. 3) that is connected to and actuates the impeller 12 through the medium of a set of bevel bears designated generally as 16.

The impeller 12, fin 11, and intermediate drive shaft 15 are all movably supported from the keel 10 such that the shaft 15 controls the impeller 12 while the fin is independently rotatable through a full 360 degrees. Thus this arrangement offers the advantage that it utilizes a unidirectional impeller drive and the desired directional control is provided by suitably positioning the fin that houses the drive for the impeller. Thus no separate rudder is required and its associated drag is completely avoided.

This mounting arrangement includes a hollow outer support column 18 having an annular attachment shoulder 19 at its lower end that is secured to the keel 10 by suitable fasteners 20. The column 18 receives an inner hollow support column 21 in freely rotatable telescoping relationship with the lower portion of the inner column 21 having an annular shoulder 22 that is suitably secured to the rudder housing 11 by the fasteners 23.

At its upper end the outer column 18 is threaded externally to receive an annular sealing nut 25 that cooperates with a packing gland 26 to prevent ingress of the sea. At its upper end the sealing nut 25 receives a roller bearing race 27 and thereby supports the rudder steering wheel 28 in frictionless rotating relationship. As shown in Fig. 2, the steering wheel 28 includes an inner split ring assembly 29 adapted to grip and support the upper end 30 of the inner support column 21. Suitable clamping facilities 31 are provided for this purpose. Thus the inner support column 21 is actually carried by the outer column 18 and free relative rotation therebetween is facilitated by the intermediate bearing arrangement 27. Finally, the inner column 21 receives the vertical shaft 15 in frictionless rotating relationship, and for this purpose, upper and lower roller bearing races 33 and 34, respectively, are located between the inner column 21 and the vertical shaft 15.

It should be apparent that the position of the fin 11 may be controlled by rotating the inner support column 21 and this may be done from a remote point by means of a rope 36 having a pulley-like connection with the steering wheel 28. This positioning of the fin is carried out independently of the impeller control. Similarly, the vertical drive shaft 15 and the impeller 12 are free to move independently of the fin.

A flexible coupling is connected to and driven by the drive shaft 13 and translates the torque about a horizontal axis as delivered by drive shaft 13 to torque about a vertical axis for application to the vertical intermediate shaft 15.

In the illustrated arrangement, the drive shaft 13 is located at the approximate elevation of the top end of the vertical shaft 15 and the flexible coupling utilizes a two stage motion transmitting apparatus. The first stage consists of a conventional endless chain and sprocket arrangement, generally designated as 39, that transfers the torque of the drive shaft to a higher horizontal plane and the second stage consists of an arcuate flexible shaft 40 that translates the torque about this elevated horizontal axis to a torque about a vertical axis as required by the vertical shaft 15.

An arcuate supporting frame, generally triangular in cross section (see Fig. 6), receives the flexible shaft and includes oppositely inclined side panels 41 having their bottom ends flanged, as at 42, and secured to the engine beds 14 by suitable bolts 43, and having their upper ends connected by a plurality of spaced cross plates 44. The side panels 41 are of a generally arcuate form and are arranged such that the successive cross plates 44 mounted thereon are inclined at progressively increasing angles with the regions between the cross plates being recessed as indicated at 45 to provide necessary clearance for the flexible shaft. Cylindrical bearing sleeves 46 are secured to the cross plates by suitable bolts 47 and the arrangement is such that the axes of the bearing sleeves are correspondingly inclined at progressively increasing angles.

The flexible shaft itself includes a plurality of individual rigid shaft elements of the general form of the element shown in Fig. 8 which consists of a straight center portion 50 carrying a pair of oppositely extending lateral flanges 51 and 52 at its opposite ends with the pairs of flanges being oriented in substantially right angular relationship.

In the makeup of the flexible shaft however, a variety of slightly different forms of individual shaft elements are employed. For instance, certain of these elements 53 include an elongated center portion adapted for rotatable mounting in the bearing sleeves, while the shaft elements 54 adjacent to the shaft elements 53 preferably have shortened center portions of a length just sufficient to provide desired clearance lengthwise of the shaft. Each of the end elements 55, one of which is shown in Fig. 7, has a single pair of flanges adapted for connection to the flanges of the intermediate shaft element 54 immediately adjacent thereto. The end elements, of course, are directed substantially along the line of the shaft with which they are associated, and thus the horizontal upper element is mounted in a horizontal bearing sleeve while the vertical lower element is mounted in the top end of the inner support column.

Fig. 7 also illustrates that the shaft elements are supported within the bearing sleeves by oppositely inclined sets of roller bearings 56 and 57 which resist endwise thrusts and maintain the shaft elements centered within the bearing sleeves. While Fig. 7 illustrates the mounting arrangement of an end shaft element 55, it will be understood that the bearing arrangement of the shaft elements 53 is identical.

Connections between the various shaft elements are effected by means of annular discs 59 of a resiliently distortable material such as rubber or a compound of rubber, the only requirement being that the discs resist any tendency to twist associated with the transmission of rotary power from one shaft element to an adjacent element while simultaneously providing endwise flexing necessary to accommodate the eccentric movements resulting from the fact that the adjacent shaft elements are inclined relative to one another.

The discs are secured between the flanges of adjacent shaft elements by suitable bolts 60 with the flanges of one element oriented at right angles to the flanges of the other element. The flanges define a central recess 61 to provide adequate endwise clearance to accommodate the flexing of the shaft. At the same time, the right-angular relationship of the adjacent flanges precludes the possibility of metal to metal engagement resulting from the slight twisting of the discs associated with the transmission of the rotary power.

The spaced apart progressively inclined bearing sleeves provide a sufficient number of fixed bearing points that adequately confine the action of the flexible shaft while the relatively free intermediate shaft elements and associated flexible discs accommodate all necessary eccentric movements associated with the torque translating action of the flexible shaft. Thus the shaft transmits energy through the action of the flexible discs and metal to metal engagements are eliminated. For this reason, the arrangement of the invention provides a highly desirable driving system characterized by its quietness and smoothness in operation.

Furthermore, the arrangement is incorporated into a marine craft so as to avoid the necessity of a rudder mounting by providing universal movement of the chambered fin that houses the impeller. With this arrangement any desired directional control is readily achieved even though the impeller control is unidirectional. For this reason the arrangement offers a significant savings over comparable systems which employ a reversible marine engine.

It should be understood that the description of the preferred from of the invention is for the purpose of complying with Section 112, Title 35 of the U.S. Code and that the appended claims should be construed as broadly as the prior art will permit.

I claim:

1. In a marine craft or the like of the type having a hull formed with a horizontally extending keel, a drive system for the impeller of said craft and comprising a drive shaft disposed in the hull of the craft and extending substantially parallel to the horizontal keel of the craft, a substantially vertical shaft rotatably mounted in the keel in coplanar relationship with said drive shaft and extending through said keel for connection to the impeller, and a flexible coupling connecting said shafts and comprising an arcuate supporting frame supported by the keel and extending in coplanar relationship with said shafts and providing a plurality of progressively increasingly angularly inclined bearings, a plurality of shaft elements ranging from a substantially vertical element connected to the vertical shaft to a substantially horizontal element connected to the drive shaft with certain of said shaft elements being journalled in said bearings, and flexible means connected between adjacent ends of said shaft elements to transmit torque therebetween while accommodating relative endwise movements therebetween.

2. In a marine craft or the like of the type having a hull formed with a horizontally extending keel, a drive system for the impeller of said craft and comprising a drive shaft disposed in the hull of the craft and extending substantially parallel to the horizontal keel of the craft, a substantially vertical shaft rotatably mounted in the keel in coplanar relationship with said drive shaft and extending from a point adjacent the horizontal plane of said drive shaft through said keel for connection to the impeller, and a flexible coupling connecting said shafts and comprising an arcuate supporting frame supported by the keel and extending in coplanar relationship with said shafts and providing a plurality of progressively increasingly angularly inclined bearings, a plurality of shaft elements ranging from a substantially vertical element connected to the vertical shaft to a substantially horizontal element connected to the drive shaft through vertically extending motion transmitting means with certain of said elements being journalled in said bearings, and flexible means connected between adjacent ends of said shaft elements to transmit torque therebetween while accommodating relative endwise movements therebetween.

3. In a marine craft or the like of the type having a hull formed with a horizontally extending keel, a drive system for the impeller of said craft and comprising a unidirectional drive shaft disposed in the hull of the craft and extending substantially parallel to the horizontal keel of the craft, a substantially vertical hollow support column rotatably mounted in the keel in coplanar relationship with said drive shaft and extending through said keel to support a chambered fin that carries said impeller, steering means for rotating said support column to position said fin and said impeller, a vertical shaft telescoped within and rotatably supported by said column and extending into said fin for connection to the impeller, and a flexible coupling connecting said shafts and translating torque about a horizontal axis as developed by said drive shaft to torque about a vetical axis for delivery to said vertical shaft, the arrangement being such that said fin and said vertical shaft are independently rotatable such that the impeller is unidirectional and directional control for the craft is provided by appropriately positioning said fin.

4. In a marine craft or the like of the type having a hull formed with a horizontally extending keel, a drive system for the impeller of said craft and comprising a unidirectional drive shaft disposed in the hull of the craft and extending substantially parallel to the horizontal keel of the craft, a substantially vertical hollow support column rotatably mounted in the keel in coplanar relationship with said drive shaft and extending through the keel to support a chambered fin that carries the impeller, steering means for rotating said support column to position said fin and said impeller, a vertical shaft telescoped within and rotatably supported by said column and extending from a point adjacent the horizontal plane of said drive shaft through said keel and into said chambered fin for connection to the impeller, and a flexible coupling connecting said shafts and comprising an arcuate supporting frame supported by the keel and extending in coplanar relationship with said shafts and providing a plurality of progressively increasingly angularly inclined bearings, a plurality of shaft elements ranging from a substantially vertical element connected to the vertical shaft to a substantially horizontal element connected to the drive shaft through vertically extending motion transmitting means with certain of said elements being journalled in said bearings, flexible means connected between adjacent ends of said shaft elements to transmit torque therebetween while accommodating relative endwise movements therebetween, the arrangement being such that said fin and said vertical shaft are independently rotatable and directional control for the craft is provided by appropriately positioning the fin which in turn positions the unidirectional impeller.

5. In a marine craft or the like of the type having a hull that includes a horizontally extending keel portion with an impeller mounted beneath said hull for driving the craft, a drive system for the impeller of said craft and comprising a drive shaft rotatably mounted in the hull of the craft and extending substantially parallel to the horizontal keel portion, a second drive shaft rotatably supported from the hull for rotation about its own axis and extending in angular relation to said first-mentioned drive shaft for connection to the impeller, and a flexible coupling connecting said shafts and comprising an arcuate supporting frame supported by the hull and providing a plurality of progressively, increasingly angularly inclined bearings, a pluarlity of shaft elements ranging from a substantially horizontal element connected to the drive shaft to an element substantially coaxial with said second drive shaft and connected thereto with certain of said shaft elements being journalled in said bearings, and flexible means connected between adjacent ends of said shaft elements to transmit torque therebetween while accommodating relative endwise movements therebetween.

6. In a marine craft or the like of the type having a hull that includes a horizontally extending keel portion with an impeller mounted beneath said hull for driving the craft, a drive system for the impeller of said craft and comprising a unidirectional drive shaft rotatably mounted in the hull of the craft and extending substantially parallel to the horizontal keel portion, a chambered fin adjacent the underside of said hull and rotatably supporting said impeller, a hollow support column rotatably supported from the hull for rotation about its own axis and extending in angular relation to said first-mentioned drive shaft to support the chambered fin that carries said impeller, steering means for rotating said support column to position said fin and said impeller, a shaft telescoped within and rotatably supported by said column for rotation about its own axis and extending into said fin for connection to the impeller, and a flexible coupling connecting said shafts and comprising an arcuate supporting frame supported by the hull and providing a plurality of progressively increasingly angularly inclined bearings, a plurality of shaft elements ranging from a substantially horizontal element connected to the drive shaft to an element substantially coaxial with said telescoped shaft and connected thereto, with certain of said shaft elements being journalled in said bearings, and flexible means connected between adjacent ends of said shaft elements to transmit torque therebetween while accommodating relative endwise movements therebetween, the arrangement being such that said fin and said telescoped shaft are independently rotatable such that the impeller is unidirectional and directional control for the craft is provided by appropriately positioning said fin.

References Cited in the file of this patent

UNITED STATES PATENTS

| | | |
|---|---|---|
| 816,163 | Hellmann | Mar. 27, 1906 |
| 2,536,894 | Wanzer | Jan. 2, 1951 |